No. 639,298. Patented Dec. 19, 1899.
L. H. SEELY.
WHEEL FOR TRACTION ENGINES.
(Application filed Mar. 11, 1899.)
(No Model.)
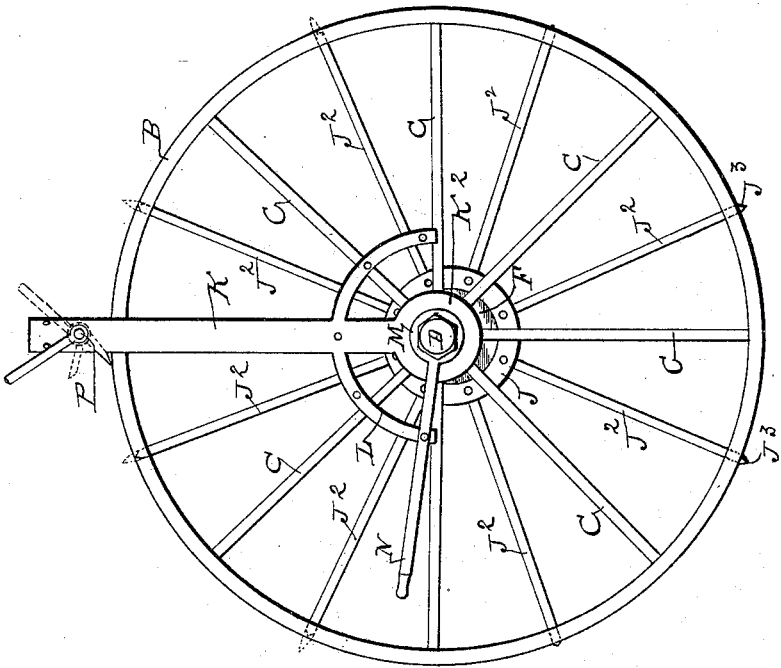
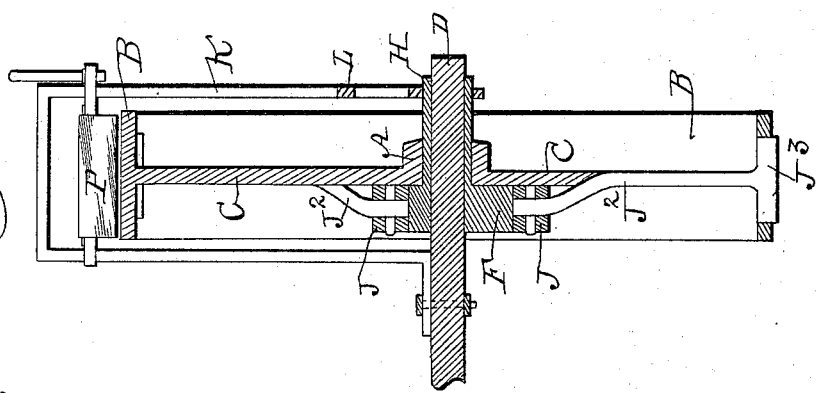

UNITED STATES PATENT OFFICE.

LEWIS H. SEELY, OF JOLLEY, IOWA.

WHEEL FOR TRACTION-ENGINES.

SPECIFICATION forming part of Letters Patent No. 639,298, dated December 19, 1899.

Application filed March 11, 1899. Serial No. 708,787. (No model.)

*To all whom it may concern:*

Be it known that I, LEWIS H. SEELY, a citizen of the United States of America, residing at Jolley, in the county of Calhoun and State of Iowa, have invented a Wheel for Traction-Engines, of which the following is a specification.

My object is to prevent the annoyances and delays and difficulties incident to the slipping of traction-wheels on some roads and surfaces and to facilitate the advance of an engine by increasing the friction of a wheel as it treads on hard or slippery places in its line of advance.

My invention consists in the arrangement and combination of adjustable operative mechanism and a fixed frame with the hub and axle and rim of a wheel, as hereinafter set forth, pointed out in my claims, and illustrated in the accompanying drawings, in which—

Figure 1 is a sectional view of the wheel and axle, showing a frame fixed to the axle to support operating devices adjustably connected with the frame, the axle, and the hub. Fig. 2 is a side view of the wheel, the fixed frame, and portions of the operative mechanism for preventing the wheel from slipping on the surface over which an engine is to be moved.

The letter A designates the hub, and B the tire or rim, of a wheel that may vary in size and weight, as desired. A plurality of spokes C radiate from the hub to the rim and are fixed thereto, as required, to rigidly connect the hub and rim.

D is a wheel-axle, and F is an eccentric that has an integral sleeve H fitted on the axle and within the hub, as clearly shown in Fig. 1, and, as required, to be rotated jointly and independently of the hub and wheel.

J is a hub or ring fitted on the eccentric F, and a plurality of bent arms $J^2$ are fixed to the ring by means of bolts or rivets or in any suitable way to extend radially to the rim B of the wheel.

Cross-heads $J^3$ on the free ends of the arms J are fitted to slide in transverse slots in the rim. The outer edges of the cross-heads may be beveled or sharpened, as shown, to bite on a hard surface or penetrate the ground, as required, to prevent the wheel from slipping.

A frame K is fixed to the axle D and arched over the rim of the wheel and connected with the hub of the wheel by means of a ring $K^2$ at the end of the outer upright portion in such a manner that it will not interfere with the rotation of the hub on the sleeve H, fitted on the axle D. A semicircle L, formed on or fixed to the upright of the frame, serves as a member of a locking device for retaining the adjustable eccentric stationary relative to the hub of the wheel and to rotate jointly therewith. A wrench M, fitted to the angular outer end of the sleeve H, has an arm N, that is adjustably connected with the semicircle L by means of a pin passed through coinciding apertures in the arm and the semicircle or in any suitable way, as required, to lock the sleeve and the eccentric F in fixed positions relative to the axle D.

P represents an adjustable device connected with the top of the frame K for scraping and cleaning the rim of the wheel when mud adheres to the wheel.

In the practical use of my invention, when the eccentric F is in position, as shown in Figs. 1 and 2, and rigidly connected or locked to the frame K by means of the wrench M on the end of the sleeve H, as shown in Fig. 2, the cross-heads $J^3$ on the ends of the arms $J^2$ will be projected through the slots in the rim of the wheel to engage, bite, and penetrate the surface over which the wheel rolls and to thereby prevent the wheel from slipping. By reversing the position of the arm N of the wrench M, and thereby also reversing the position of the eccentric F on the axle D, the cross-heads will project at the top of the wheel at each revolution of the wheel, and consequently will not engage the surface over which the wheel rolls.

Having thus described the construction and operation of my invention, the purpose and utility thereof will be obvious to persons familiar with the art to which the invention pertains, and what I therefore claim as new, and desire to secure by Letters Patent, is—

1. In a wheel for traction-engines, a hub adapted to admit a rotatable sleeve that is integral with an eccentric, an eccentric having an integral sleeve fitted on the axle and extended through the hub of the wheel, a ring fitted on the eccentric, arms fixed to the ring and extended radially to terminate in openings in the rim of the wheel, and means for fastening the eccentric and sleeve in a fixed position relative to the axle, for the purposes stated.

2. In a wheel for traction-engines, an eccentric having an integral sleeve fitted in the hub of the wheel, a ring fitted on the eccentric, arms fixed to the ring and extended radially to terminate in openings in the rim of the wheel, and means for fastening the eccentric and sleeve in a fixed position relative to the axle, cross-heads on the free ends of the arms, a fixed frame arched over the rim of the wheel and connected with the outer end of the sleeve, and means for locking the eccentric and sleeve to the frame, to operate in the manner set forth.

3. In a wheel for traction-engines, an eccentric having an integral sleeve fitted in the hub of the wheel, a ring fitted on the eccentric, arms fixed to the ring and extended radially to terminate in openings in the rim of the wheel, a wheel having openings in the rim and means for fastening the eccentric and sleeve in a fixed position relative to the axle, cross-heads on the free ends of the arms, a fixed frame arched over the rim of the wheel and connected with the outer end of the sleeve, and means for locking the eccentric and sleeve to the frame, to operate in the manner set forth.

4. A wheel for traction-engines comprising an eccentric having an integral sleeve fitted in the hub of the wheel, a ring fitted on the eccentric, arms fixed to the ring and extended radially to terminate in openings in the rim of the wheel, and means for fastening the eccentric and sleeve in a fixed position relative to the axle, cross-heads on the free ends of the arms, a frame fixed to the axle and arched over the rim of the wheel and connected with the outer end of the sleeve, a perforated semicircle fixed to the arched frame, a wrench fitted to the end of the sleeve and adjustably connected with the semicircle by means of a pin, all arranged and combined to operate in the manner set forth.

LEWIS H. SEELY.

Witnesses:
W. A. LEGG,
L. B. IRONS.